(12) United States Patent
Watarai

(10) Patent No.: US 8,393,244 B2
(45) Date of Patent: Mar. 12, 2013

(54) BICYCLE OPERATING DEVICE

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 1117 days.

(21) Appl. No.: 11/834,170

(22) Filed: Aug. 6, 2007

(65) Prior Publication Data

US 2009/0038427 A1 Feb. 12, 2009

(51) Int. Cl.
 *F16C 1/10* (2006.01)
 *G05G 11/00* (2006.01)
 *G05G 13/00* (2006.01)
(52) U.S. Cl. .......................................... 74/502.2; 74/489
(58) Field of Classification Search .................. 74/502.2, 74/488, 489, 473.12; 192/217; B62M 25/04
See application file for complete search history.

(56) References Cited

U.S. PATENT DOCUMENTS

| 5,159,851 | A | * | 11/1992 | Rahmes | 74/551.9 |
|---|---|---|---|---|---|
| 5,176,042 | A | * | 1/1993 | Bean et al. | 74/502.2 |
| 5,222,412 | A | | 6/1993 | Nagano | |
| 5,400,675 | A | * | 3/1995 | Nagano | 74/502.2 |
| 5,479,776 | A | * | 1/1996 | Romano | 74/502.2 |
| 5,768,945 | A | * | 6/1998 | Ose | 74/489 |
| 7,080,723 | B2 | * | 7/2006 | Uno et al. | 192/217 |
| 7,201,080 | B1 | | 4/2007 | Canonico | |
| 7,854,180 | B2 | * | 12/2010 | Tetsuka | 74/473.12 |
| 2001/0053724 | A1 | * | 12/2001 | Campagnolo | 474/80 |
| 2003/0019712 | A1 | * | 1/2003 | Dal Pra' | 192/217 |
| 2005/0109577 | A1 | * | 5/2005 | Uno et al. | 192/217 |
| 2006/0070480 | A1 | * | 4/2006 | Fujii | 74/502.2 |
| 2006/0213311 | A1 | * | 9/2006 | Ose | 74/502.2 |
| 2007/0068318 | A1 | * | 3/2007 | Jordan et al. | 74/502.2 |
| 2007/0137361 | A1 | | 6/2007 | Fujii | |
| 2008/0168856 | A1 | * | 7/2008 | Tetsuka | 74/502.2 |

FOREIGN PATENT DOCUMENTS

| EP | 1 264 765 A1 | 12/2002 |
|---|---|---|
| EP | 1 787 903 A1 | 5/2007 |
| JP | 2-120299 | * 9/1990 |
| JP | 6-278678 | * 10/1994 |

OTHER PUBLICATIONS

English Abstract of JP 6-278678, Oct. 4, 1994.*
European Search Report of corresponding EP Application No. 08 15 4545.1 dated Sep. 28, 2010.

* cited by examiner

*Primary Examiner* — Vinh Luong
(74) *Attorney, Agent, or Firm* — Global IP Counselors, LLP

(57) ABSTRACT

A bicycle operating device is provided with a base member, a brake operating lever and a shift operating member. The base member is configured to be attached to a bicycle. The brake operating lever is pivotally coupled to the base member about a pivot axis to perform a braking operation when the brake operating lever is moved in a first direction. The shift operating member is movably arranged to move from a rest position in a second direction to perform a gear shift operation. The shift operating member is further movably arranged to move from the rest position to a full stroke position in a third direction different from the first and second directions without causing the gear shifting operation.

8 Claims, 13 Drawing Sheets

BICYCLE OPERATING DEVICE

BACKGROUND OF THE INVENTION

1. Field of the Invention

This invention generally relates to a bicycle operating device for operating a bicycle component. More specifically, the present invention relates to a bicycle operating device having a brake operating lever and a shift operating member formed together as unit that attached to a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Currently, many different types of bicycle operating devices exist for performing both shifting and braking operations. Typically, bicycle shifters mechanically operate derailleurs via cables, while bicycle brake operating levers mechanically operate brake devices via cables. In both cases, an operating force is typically applied by one of the rider's fingers to operate an operating member, which in turn transmitted the operating force to operate the bicycle component (e.g., the derailleur or the brake device) by a cable that was fixed at one end to the operating member. More recently, electric switches have been used instead of mechanically operated members in order to operate the bicycle shifting mechanism (e.g., the derailleur). In either case (mechanical or electrical), when shifting and braking operations are combined in a single integrated bicycle operating device, it is often desirable to have the shift operating member located behind the brake operating member. In this type of arrangement, when the brake operating member is operated, the shift operating member is often moved rearwardly. During a full braking operation, the shift operating member might contact the handlebar and prevent the rider from perform a full braking operation.

In view of the above, it will be apparent to those skilled in the art from this disclosure that there exists a need for an improved bicycle operating device. This invention addresses this need in the art as well as other needs, which will become apparent to those skilled in the art from this disclosure.

SUMMARY OF THE INVENTION

One object of the present invention is to provide a bicycle operating device that combines both shifting and braking operations into a single control device that is easy to operate.

The foregoing objects can basically be attained by providing a bicycle operating device that comprises a base member, a brake operating lever and a shift operating member. The base member is configured to be attached to a bicycle. The brake operating lever is pivotally coupled to the base member about a pivot axis to perform a braking operation when the brake operating lever is moved in a first direction. The shift operating member is movably arranged to move from a rest position in a second direction to perform a gear shift operation. The shift operating member is further movably arranged to move from the rest position to a full stroke position in a third direction different from the first and second directions without causing the gear shifting operation.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. For example, the present invention will be described with respect to a shift operating member that operates an electrical switch for the sake of simplicity. However, it will be apparent to those skilled in the art from this disclosure that a mechanical shifting unit can be operated by the shift operating member instead of an electrical switch without departing from the present invention.

Figure 1:
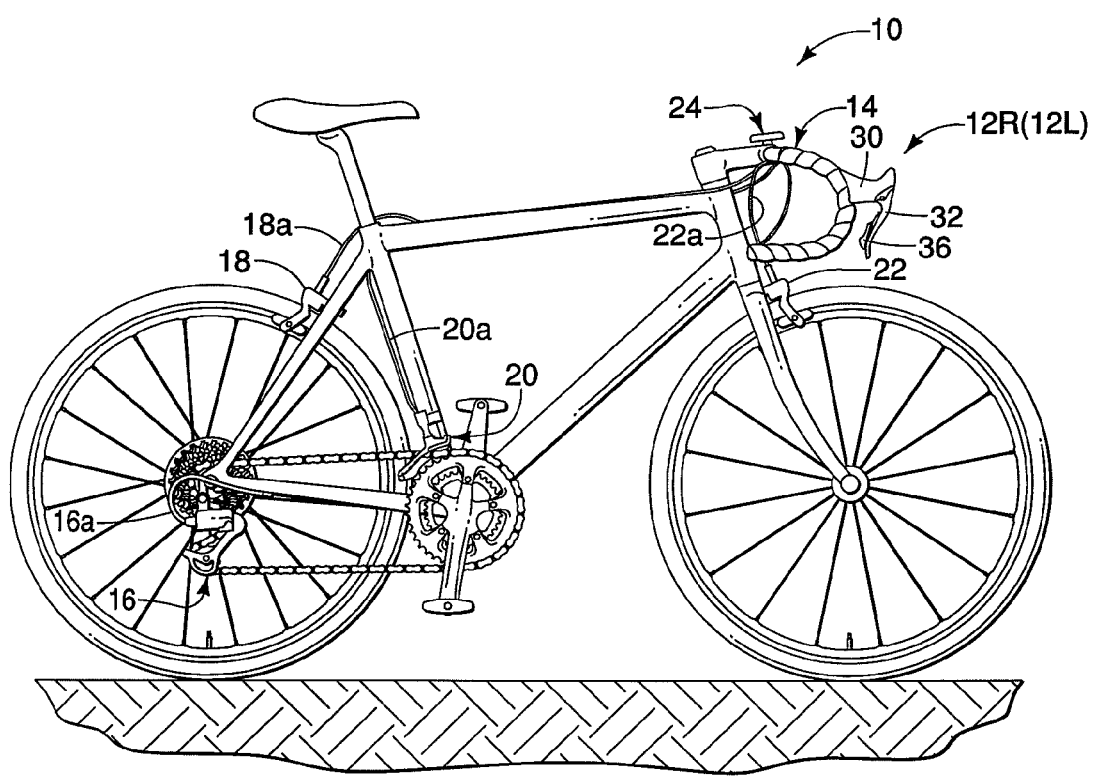
FIG. 1 is a side elevational view of a bicycle equipped with a pair of bicycle control devices (only one shown) in accordance with a first embodiment of the present invention.
Figure 2:
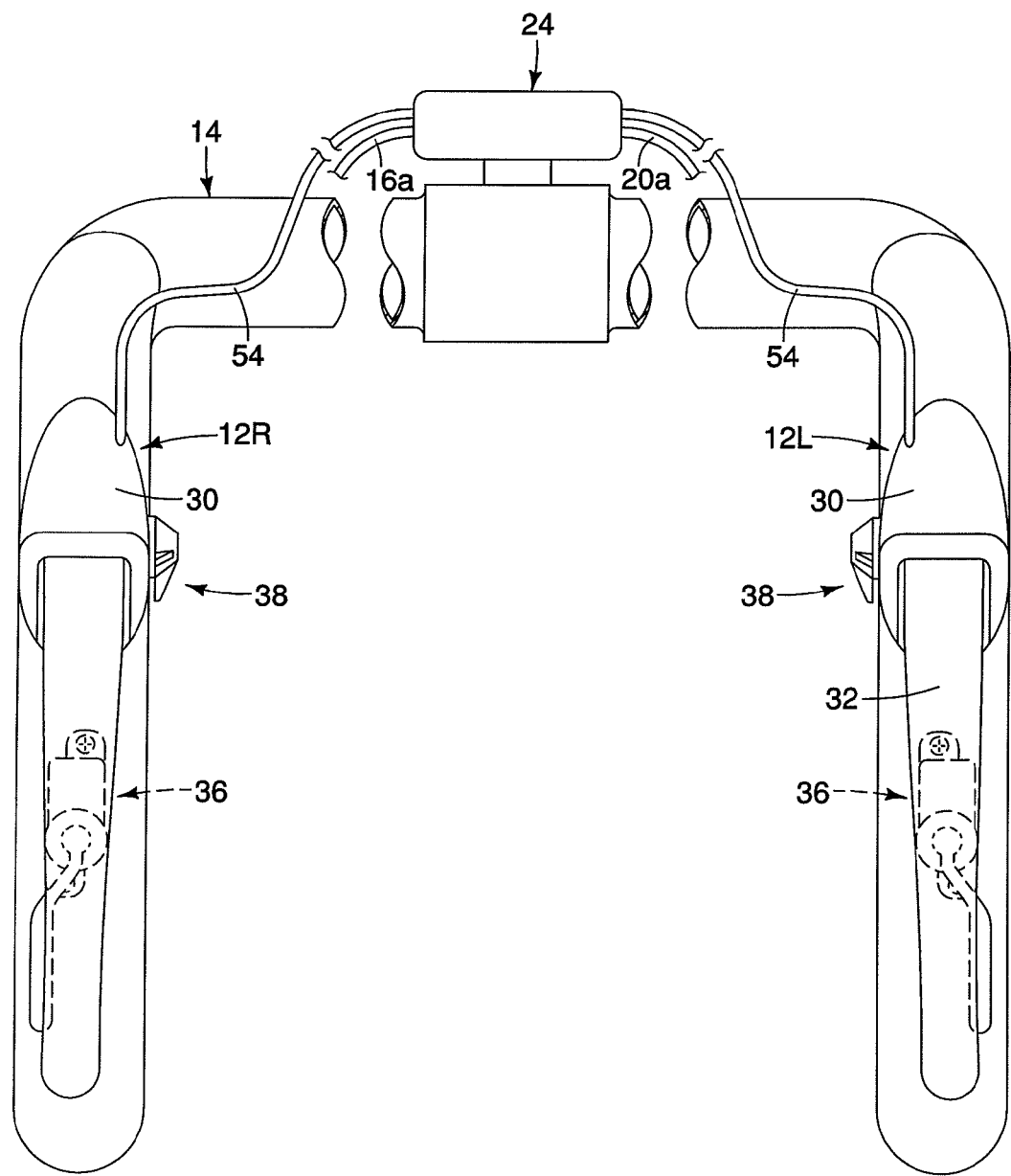
FIG. 2 is a partial enlarged front elevational view of the handlebar of the bicycle illustrated in FIG. 1, with the right and left bicycle control devices mounted thereto in accordance with the first embodiment.

Referring initially to FIGS. 1 and 2, a bicycle 10 is illustrated with a pair of bicycle control devices 12R and 12L (only one shown in FIG. 1) mounted on a bicycle handlebar 14 in accordance with a first embodiment of the present invention. The right and left hand side control devices 12R and 12L are integrated electrical shift control and mechanical brake control devices. The right and left hand side bicycle control devices 12R and 12L are essentially identical in construction and operation, except that that are mirror images. Thus, only one of the control devices 12R and 12L (i.e. the control device 12R) will be discussed and illustrated herein. Moreover, the parts of right and left hand side control devices 12R and 12L that are identical or mirror images will be given the same reference numerals for the sake of brevity.

Also, since most of the parts of the bicycle 10 are well known in the art, most of the parts of the bicycle 10 will not be discussed or illustrated in detail herein, except for the parts relating to the control devices 12R and 12L of the present invention. However, it will be apparent to those skilled in the art from this disclosure that various conventional bicycle parts, which are not illustrated and/or discussed in detail herein, can also be used in conjunction with the present invention.

The bicycle control device 12R is operatively coupled to a rear bicycle shift mechanism (e.g. a rear derailleur) 16 via a controller or cycle computer 24, while the bicycle control device 12L is operatively coupled to a front bicycle shift mechanism (e.g. front derailleur) 20 via the controller 24. Also, the bicycle control device 12R is directly coupled to a rear braking device 18 via a brake cable 18a, while the bicycle control device 12L is directly coupled to a front braking device 22 via a brake cable 22a. Of course, it will be apparent to those skilled in the art from this disclosure that the bicycle control device 12R can be connected to control the front derailleur 20 and the front braking device 22, if needed and/or desired. Likewise, it will be apparent to those skilled in the art from this disclosure that the bicycle control device 12L can be connected to control the rear derailleur 16 and the rear braking device 18, if needed and/or desired.

The bicycle control devices 12R and 12L together with the controller 24 form right and left hand side bicycle brake/shift operating components of a brake/shift control system or mechanism that is configured and arranged to be fixedly coupled to the bicycle handlebar 14 to control gear shifting and braking of the bicycle 10.

Basically, each of the bicycle control devices 12R and 12L comprises a base member or brake lever bracket 30, a brake operating lever 32, a brake lever biasing member 34, a first shifting control device 36 and a second shifting control device 38. Each of the shifting control devices 36 and 38 is preferably configured and arranged to initiate a gear shifting operation. In the illustrated embodiment, the shifting control devices 36 and 38 are electrical switches. Preferably, the first and second shifting control devices 36 and 38 perform opposite shifting operations. For example, the first shifting control device 36 produces a down shift (higher gear ratio) signal that is sent to the controller 24, while the second shifting control device 38 produces up shift (lower gear ratio) signal that is sent to the controller 24. Of course, it will be apparent to those skilled in the art from this disclosure that the shifting operations performed by the first and second shifting control devices 36 and 38 can be reverse, if needed and/or desired.

Figure 10:
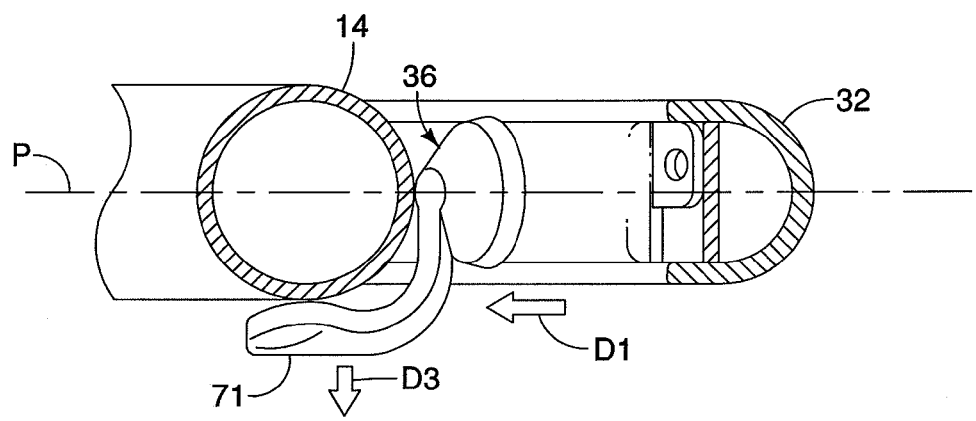
FIG. 10 is a simplified partial cross sectional view, similar to FIGS. 8 and 9, of the right hand side bicycle control device as generally viewed along section line 8-8 in FIG. 7, but when the brake operating lever in a full braking position.
Figure 11:
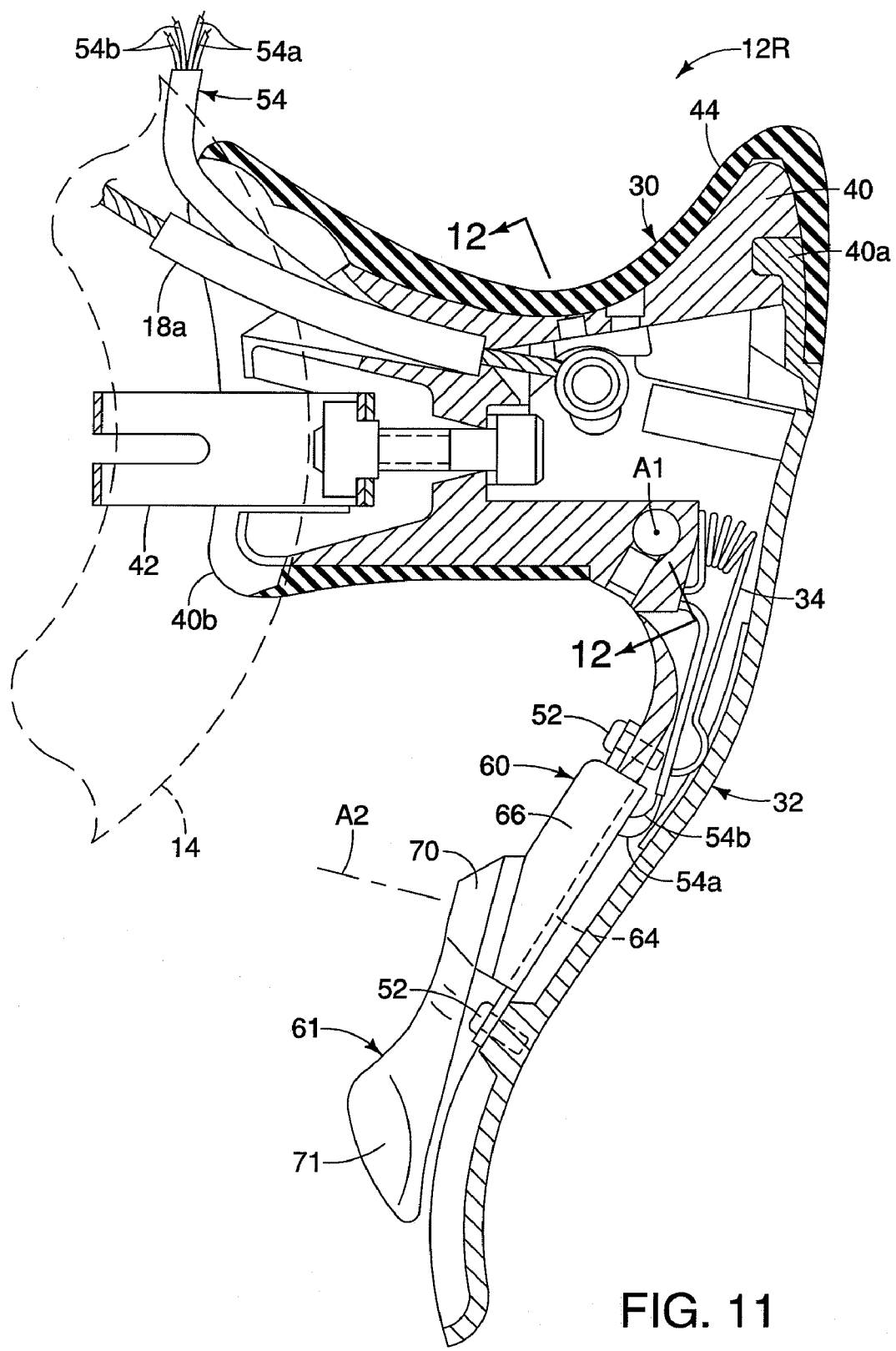
FIG. 11 is a cross sectional view of the right hand side bicycle control device as seen along section line 11-11 of FIG. 5, but with the electrical shift control switch illustrated in elevation.
Figure 12:
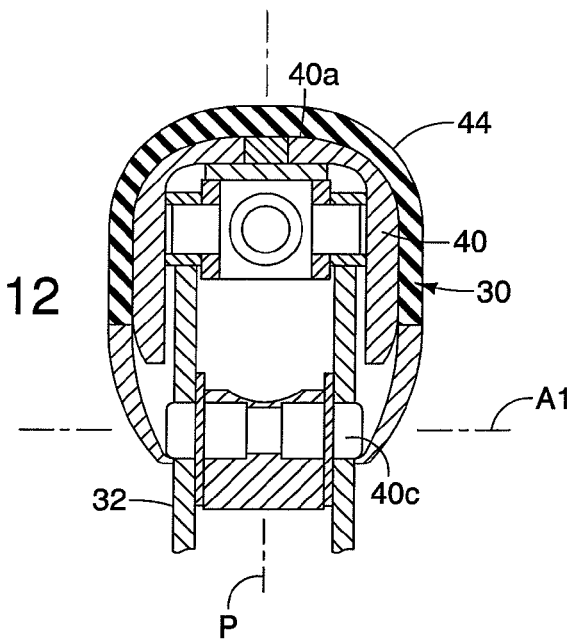
FIG. 12 is a partial cross sectional view of the right hand side bicycle control device as seen along section line 12-12 of FIG. 11.
Figure 13:
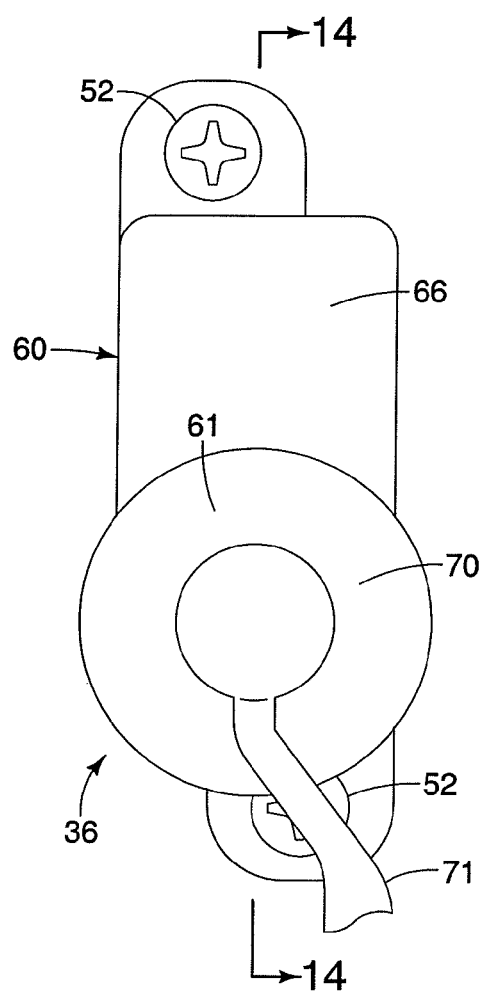
FIG. 13 is an enlarged elevational view of one of the electrical shift control switches of the right hand side bicycle control device in accordance with the first embodiment.
Figure 14:
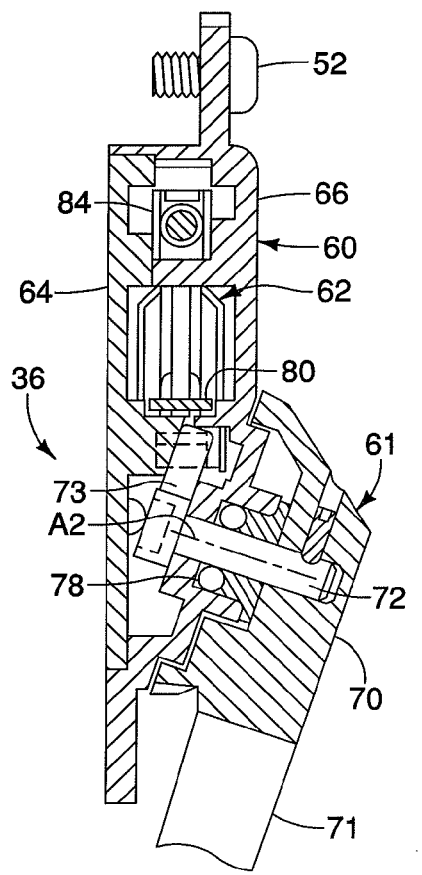
FIG. 14 is a longitudinal cross sectional view of the electrical shift control switch illustrated in FIG. 13 as seen along section line 14-14 of FIG. 13.

Referring to FIGS. 3-12, the brake lever bracket 30 has an inner side wall 30a, an outer side wall 30b, a front wall 30c and a bottom wall 30d. The brake lever bracket 30 basically comprises a rigid support or gripping body 40, a band or tube clamp 42 and an outer bracket cover 44 as best seen in FIG. 11. The gripping body 40 is configured and arranged to be fixedly coupled to the bicycle handlebar 14 by the band clamp 42 in a relatively conventional manner. Of course, it will be apparent to those skilled in the art from this disclosure that other mounting mechanisms can be used if needed and/or desired. The gripping body 40 is configured as a box-shaped bracket that facilitates gripping by the rider. The gripping body 40 includes a distal end portion 40a and a mounting end portion 40b.

The mounting end portion 40b is configured and arranged to be coupled to the bicycle handlebar 14, while the distal end portion 40a is longitudinally spaced from the mounting end portion 40b. The mounting end portion 40b has the band clamp 42 secured to the bicycle handlebar 14. The distal end portion 40a of the gripping body 40 pivotally supports the brake operating lever 32 to the gripping body 40 by a pivot pin 40c about a rotational operating axis or brake pivot axis A1.

In the control device 12R, as seen in FIG. 11, the brake cable 18a is fixedly coupled to the brake operating lever 32 such that the inner wire is pulled when the rider squeezes the brake operating lever 32. Likewise, the brake cable 22a is fixedly coupled to the brake operating lever 32 of the control device 12L such that the inner wire is pulled when the rider squeezes the brake operating lever 32. Thus, the brake operating lever 32 is pivotally coupled to the base member or brake lever bracket 30 about the pivot axis A1 to perform a braking operation when the brake operating lever 32 is moved in a first direction D1. The first direction D1 is coincident with a brake operating or pivot plane P of the brake operating lever 32.

The outer bracket cover 44 is disposed over a majority of the exterior surface of the gripping body 40. The outer bracket cover 44 overlies most of the second shifting control device 38. Preferably, the outer bracket cover 44 is constructed of a resilient synthetic material.

The brake lever biasing member 34 is preferably a spring that is mounted between the brake operating lever 32 and the gripping body 40 to urge the brake operating lever 32 from a braking position to a normal rest (non-braking) position. In particular, the brake operating lever 32 is basically pivoted about the brake pivot axis A1 by the rider pulling or squeezing the brake operating lever 32 toward the handlebar 14 along the brake operating plane P against the biasing force of the brake lever biasing member 34 such that the inner wire of the brake cable 18a or 22a is pulled.

The first shifting control device 36 is fixedly coupled to a lower intermediate portion of the brake operating lever 32 via a pair of screws 52. Thus, the first shifting control device 36 moves with the brake operating lever 32 when the brake operating lever 32 is pivoted about the brake pivot axis A1 from the rest position to the braking position in the first direction D1 along the brake operating plane P and then back to the rest position. The brake operating lever 32 has a center longitudinal axis that is perpendicular to the pivot axis A1 of the brake operating lever 32. Preferably, the first shifting control device 36 is mounted to the rearwardly facing surface of the brake operating lever 32 such that the rider can operate the first shifting control device 36 using a thumb or finger.

Figures 3, 4:
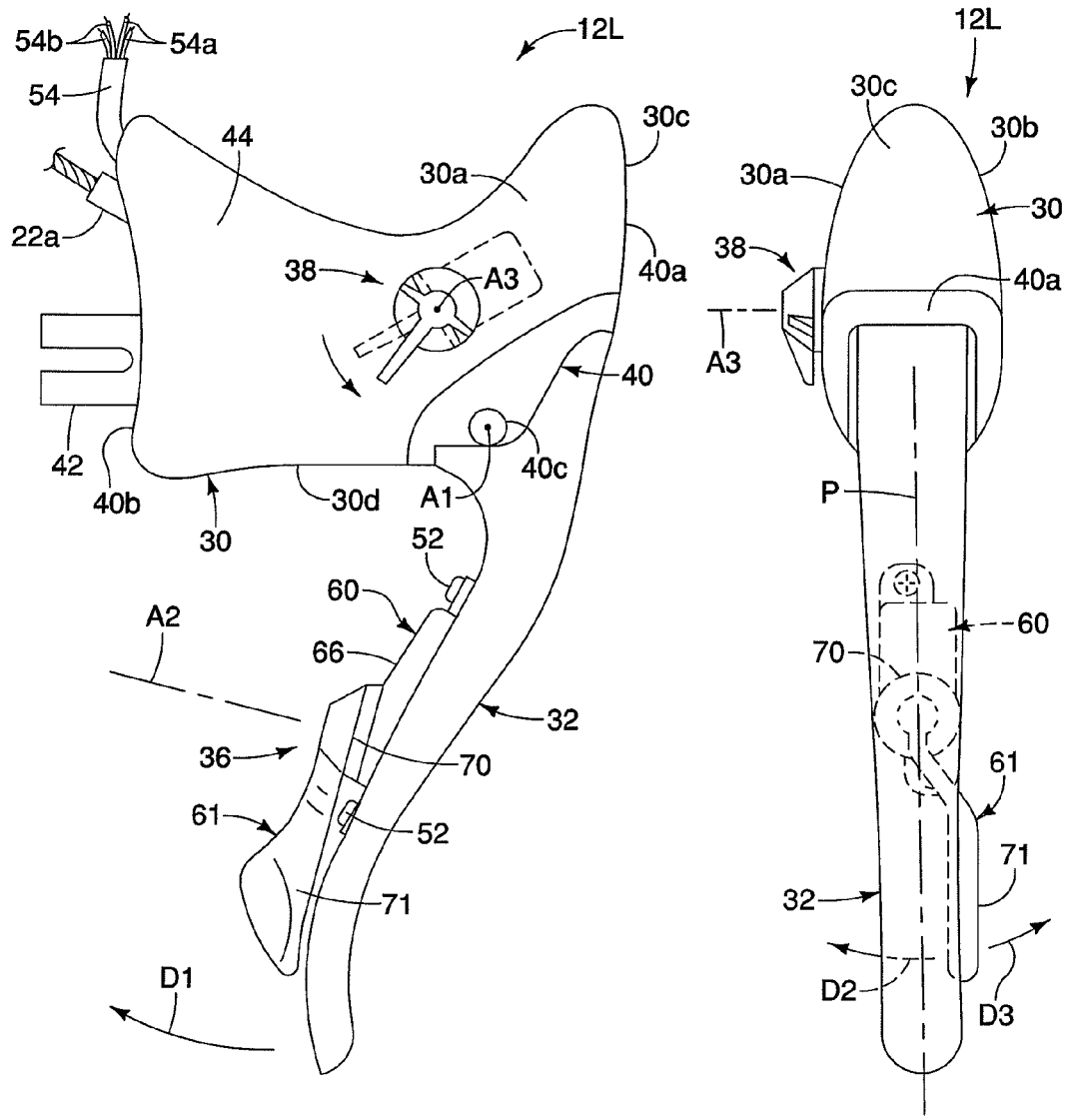
FIG. 3 is an enlarged inside elevational view of the left hand side bicycle control device illustrated in FIG. 2 in accordance with the first embodiment, with the brake operating lever in the normal rest (non-braking) position.
FIG. 4 is a front elevational view of the left hand side bicycle control device illustrated in FIG. 3 in accordance with the first embodiment, with the brake operating lever in the normal rest (non-braking) position.
Figures 5, 6:
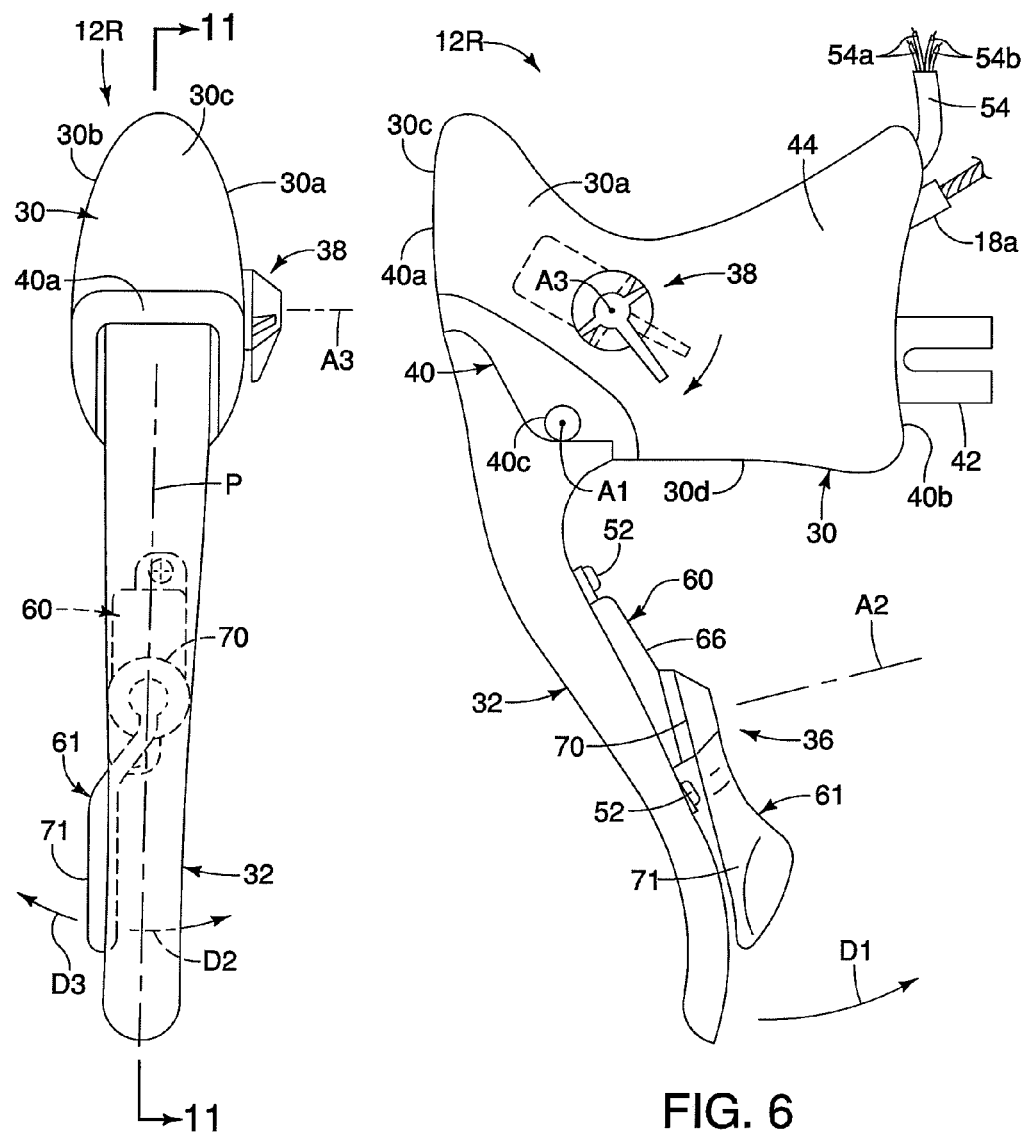
FIG. 5 is an enlarged front elevational view of the right hand side bicycle control device illustrated in FIGS. 1 and 2 in accordance with the first embodiment, with the brake operating lever in the normal rest (non-braking) position.
FIG. 6 is an inside elevational view of the right hand side bicycle control device illustrated in FIG. 5 in accordance with the first embodiment, with the brake operating lever in the normal rest (non-braking) position.

As best seen in FIGS. 2, 3 and 6, the second shifting control device 38 is fixedly coupled to the inner side wall 30a of the brake lever bracket 30. Preferably, a part of the gripping body 40 of the brake lever bracket 30 is integrally formed with the second shifting control device 38. This arrangement protects the second shifting control device 38 in the event that the bicycle 10 should fall over on its side. The second shifting control device 38 is arranged and configured such that the rider can operate the second shifting control device 38 using a thumb or finger depending on hand position.

As best seen in FIG. 2, the controller or cycle computer 24 is electrically coupled to the first and second shifting control devices 36 and 38 of each of the control devices 12R and 12L via a pair of electrical cords 54. The controller 24 is also operatively coupled to the rear and front bicycle shift mechanisms 16 and 20 to control shifting/movement of the rear and front bicycle shift mechanisms 16 and 20 in a conventional manner. For example, the rear and front bicycle shift mechanisms 16 and 20 can be conventional motorized derailleurs that are electrically coupled to the controller 24 via cords 16a and 20a, respectively. In any case, once the controller 24 determines if an up shift or down shift of the rear or front bicycle shift mechanism 16 or 20 is desired, the shifting of the rear and front bicycle shift mechanisms 16 and 20 is initiated by the controller 24 to be carried out in a conventional manner.

In particular, as seen in FIGS. 3, 6 and 11, each of the electrical cords 54 has a pair of first electrical conductors 54a and a pair of second electrical conductors 54b. One of the first electrical conductors 54a and one of the second electrical conductors 54b are electrically coupled to each of the first and second shifting control devices 36 and 38. When one of the first conductors 54a is electrically connected to one of the second electrical conductors 54b, then an electrical shift signal is transmitted to the controller 24. The controller 24 is configured and arranged to actuate the appropriate bicycle shift mechanism 16 or 20 to selectively initiate an up shift or a down shift depending on which of the shift control shifting control devices 36 and 38 sends the electrical shift signal.

The controller 24 preferably includes a microcomputer or central processing unit (CPU), input/output circuits (I/O interface), and storage devices such as a ROM (Read Only Memory) device and a RAM (Random Access Memory) device. The microcomputer of the controller 12 is programmed to control the bicycle shift mechanisms 16 and 20 based on the electrical signals received from the shifting control devices 36 and 38. Specifically, the memory devices store the programming (control logic) as well store various information such as current shift position. The controller 24 is operatively (e.g. electrically) coupled to the shifting control devices 36 and the shifting control devices 38 using the cords 54. The controller 24 is further operatively (e.g. electrically) coupled to the bicycle shift mechanisms 16 and 20 using the electrical cords 16a and 20a. The controller 24 is capable of selectively controlling the bicycle shift mechanisms 16 and 20 using the control logic. It will be apparent to those skilled in the art from this disclosure that the precise structure and algorithms for the controller 24 can be any combination of hardware and software known in the art that will carry out these functions.

Referring now to FIGS. 13 to 17, the first shifting control devices 36 of the bicycle control device 12R will now be explained in more detail. The first shifting control device 36 of the bicycle control device 12L is merely a mirror image of the first shifting control device 36 of the bicycle control device 12R, as mentioned above. The following description specifically refers to the first shifting control device 36 of the bicycle control device 12R, but also applies to the first shifting control device 36 of the bicycle control device 12L.

The first shifting control device 36 basically includes a housing or mounting portion 60, a shift operating member 61 and an electrical switch 62 (FIGS. 14 to 17). The shift operating member 61 is pivotally coupled to the housing 60 to move in a second direction D2 and a third direction D3. The electrical switch 62 is mounted within the housing 60, and operated by the shift operating member 61. Thus, the shift operating member 61 is mounted to a rearwardly facing side of the brake operating lever 32 by the housing and extends towards the handlebar 14. When the brake operating lever 32 moves in the first direction D1, the shift operating member 61 moves with the brake operating lever 32.

The housing 60 is rigidly fixed to the brake operating lever 32 by the screws 52. Preferably, the housing 60 is constructed of two pieces. For example, the housing 60 as illustrated, includes a base 64 and a cover 66 that is fixedly coupled to the base 64. The base 64 and cover 66 are preferably constructed of a lightweight, hard rigid material such as a hard rigid plastic material. The electrical switch 62 is housed within the housing 60 between the base 64 and the cover 66 and is electrically coupled to the electrical conductors 54a and 54b of the electrical cord 54.

The shift operating member 61 protrudes out from the cover 66 of the housing 60 such that rotational movement of the shift operating member 61 causes the electrical switch 62 to move from a neutral position to an actuating position as explained below. The shift operating member 61 has a base 70, a lever 71, a pivot shaft 72 and a toggle member 73.

Figure 7:
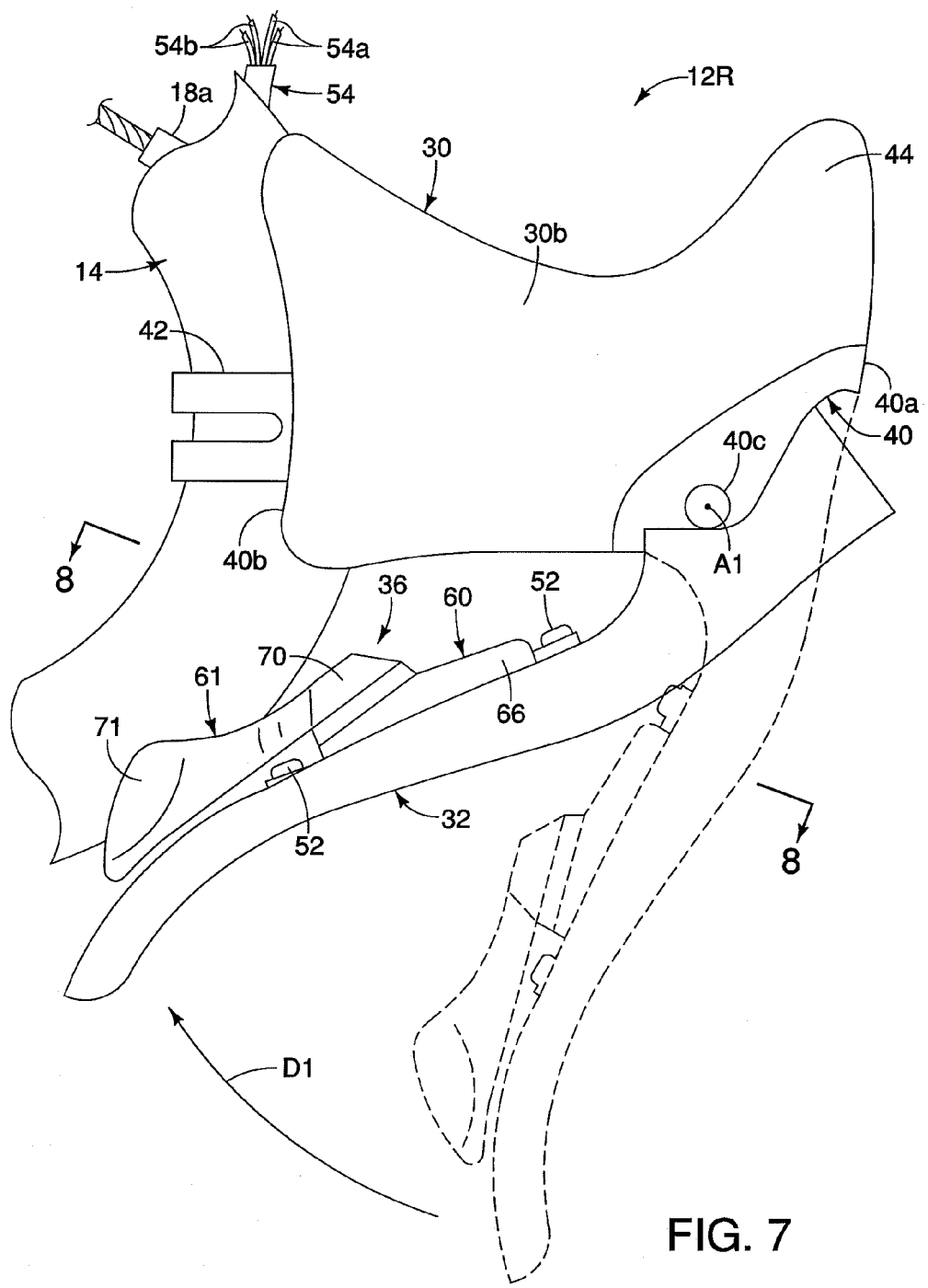
FIG. 7 is an enlarged outside elevational view of the right hand side bicycle control device illustrated in FIGS. 5 and 6 in accordance with the first embodiment, with the brake operating lever in the braking position and the shift operating member moved in a non-shifting direction.
Figure 8:
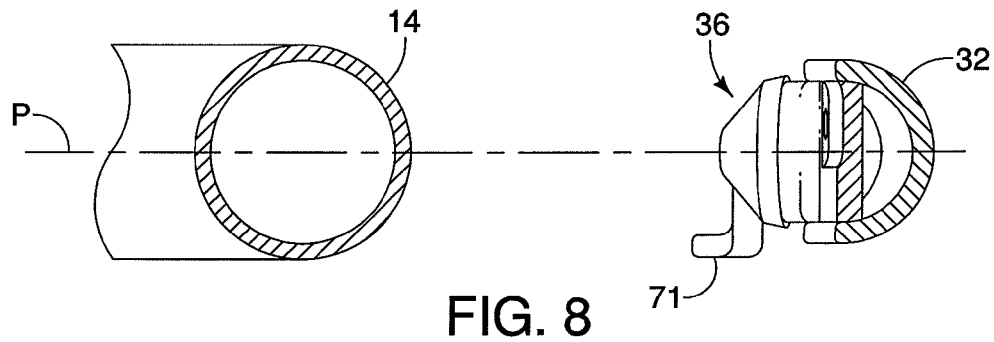
FIG. 8 is a simplified partial cross sectional view of the right hand side bicycle control device illustrated in FIGS. 5 to 7 as generally viewed along section line 8-8 in FIG. 7 when the brake operating lever in a rest position.
Figure 9:
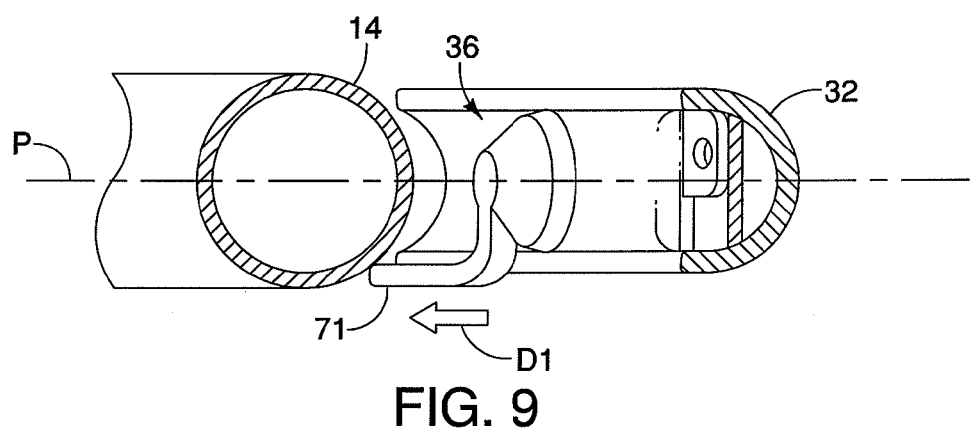
FIG. 9 is a simplified partial cross sectional view, similar to FIG. 8, of the right hand side bicycle control device as generally viewed along section line 8-8 in FIG. 7, but when the brake operating lever in an intermediate rest position.

The lever 71 extends outwardly from the base 70 for turning the base 70. The lever 71 of the shift operating member 61 constitutes a handlebar engagement portion that is laterally offset from the longitudinal axis (brake operating plane P) of the brake operating lever 32 for contacting a handlebar 14 when the brake operating lever 32 is pivoted to perform the braking operation while the brake lever bracket 30 (base member) is mounted to the handlebar 14 as seen in FIGS. 7 and 10.

The base 70 is fixedly attached the outer end of the pivot shaft 72 so that they rotate as a unit. The inner end of the pivot shaft 72 has the toggle member 73 fixedly coupled thereto. Thus, rotation of the base 70 by the rider pushing on the lever 71 causes the pivot shaft 72 and the toggle member 73 to rotate therewith. The lever 71 is configured and arranged with a handlebar engagement portion that is laterally offset from the longitudinal axis of the brake operating lever 32 for contacting the 14 handlebar when the brake operating lever 32 is pivoted to perform the braking operation, while the base member or brake lever bracket 30 is mounted to the handlebar 14.

Preferably, a bearing assembly 78 is positioned between the cover 66 and the pivot shaft 72 such that the shift operating member 61 pivots or rotates smoothly about a rotational operating axis or pivot axis A2. Preferably, the rotational operating axis A2 of the shift operating member 61 is substantially perpendicular or orthogonally arranged relative to the brake pivot axis A1. The shift operating member 61 is biased to the rest position by the electrical switch 62 as explained below.

Figure 15:
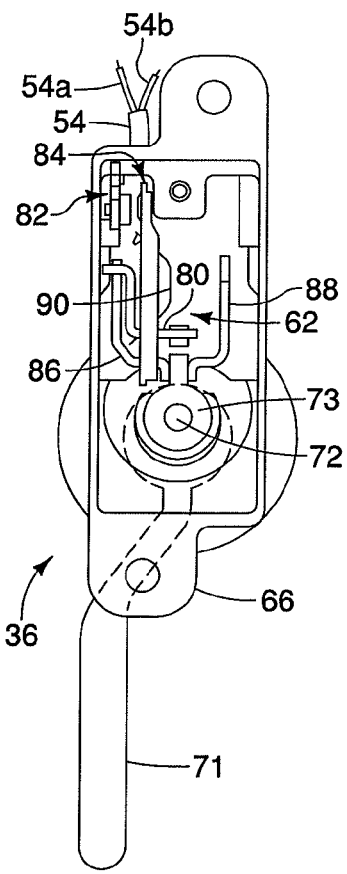
FIG. 15 is an elevational view (from the mounting side) of the electrical shift control switch illustrated in FIGS. 13 and 14, with the base removed to show the electrical shift control switch in the rest position, i.e., the movable contact spaced from the stationary contact so that no electrical connection is made between the contacts.
Figure 16:
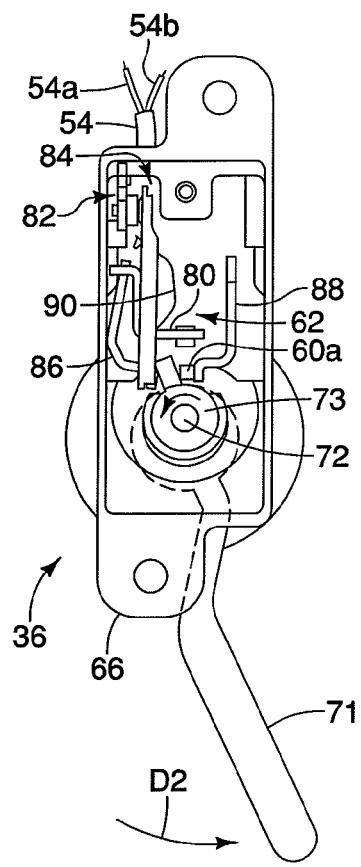
FIG. 16 is an elevational view of the electrical shift control switch illustrated in FIGS. 13 to 15 with the base removed to show the electrical shift control switch in the shift actuating position, i.e., the movable contact contacting the stationary contact after movement of the operating member a predetermined amount in the shift actuating direction so that an electrical connection is established between the contacts.
Figure 17:
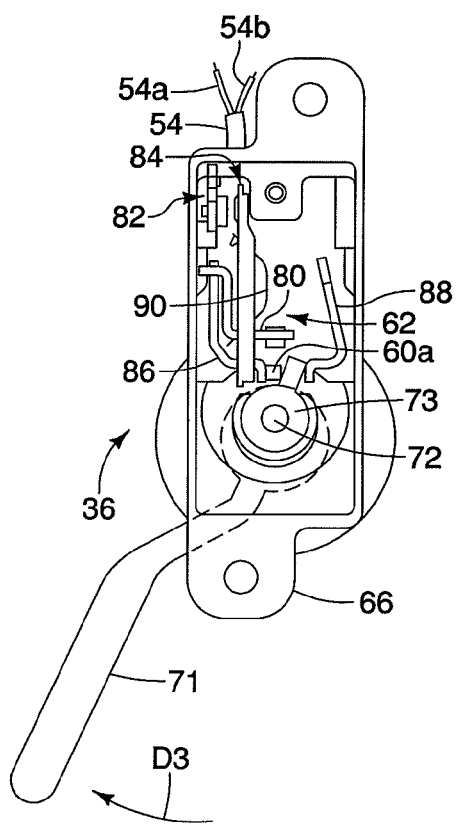
FIG. 17 is an elevational view of the electrical shift control switch illustrated in FIGS. 13 to 16 with the base removed to show the electrical shift control switch in the non-shift actuating position, i.e., the movable contact moved away from the stationary contact after movement of the operating member a predetermined amount in the non-shift actuating direction so that no electrical connection is established between the contacts.
Figure 18:
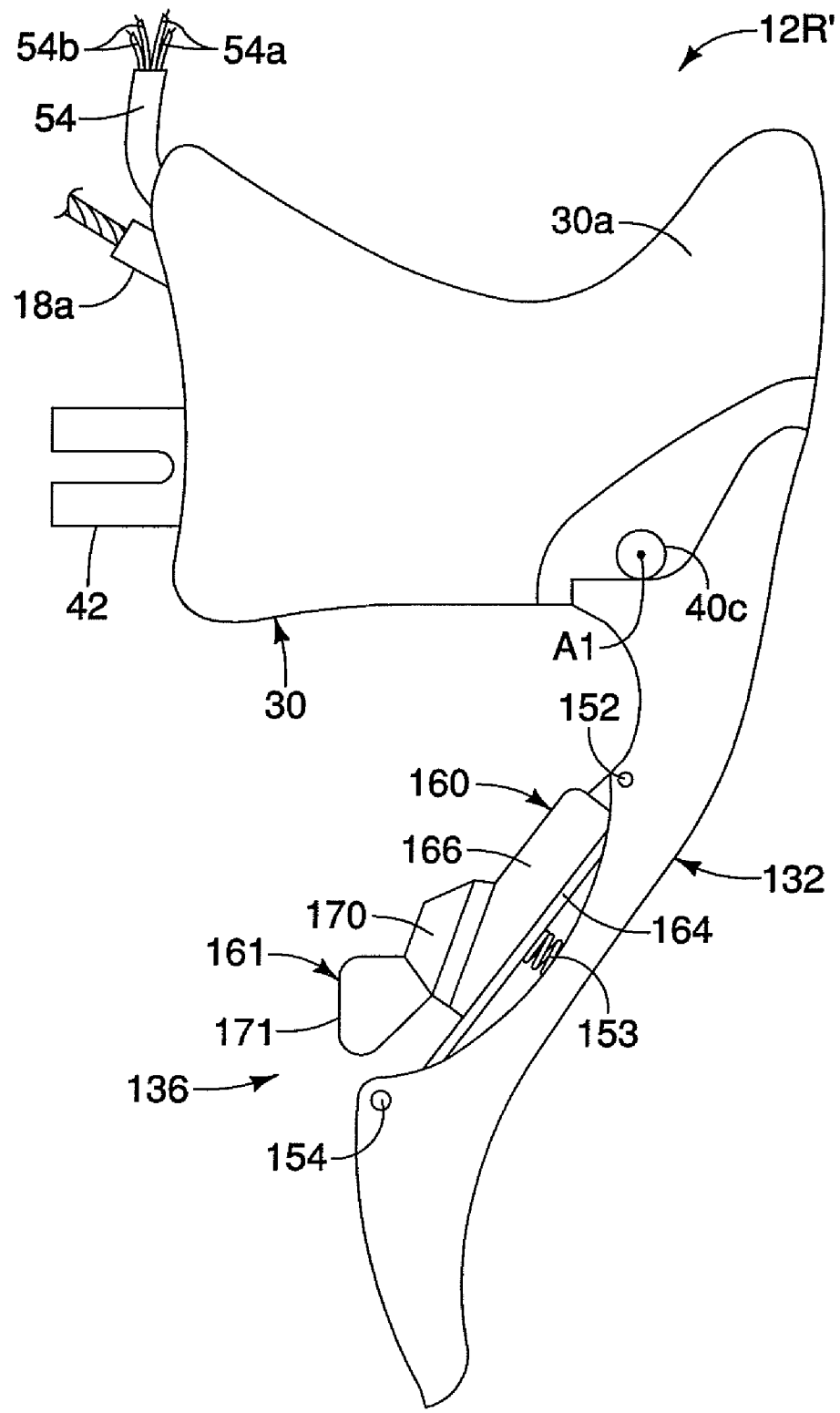
FIG. 18 is an enlarged inside elevational view of a modified right hand side bicycle control device in accordance with a second embodiment, with the brake operating lever in the normal rest (non-braking) position.
Figure 19:
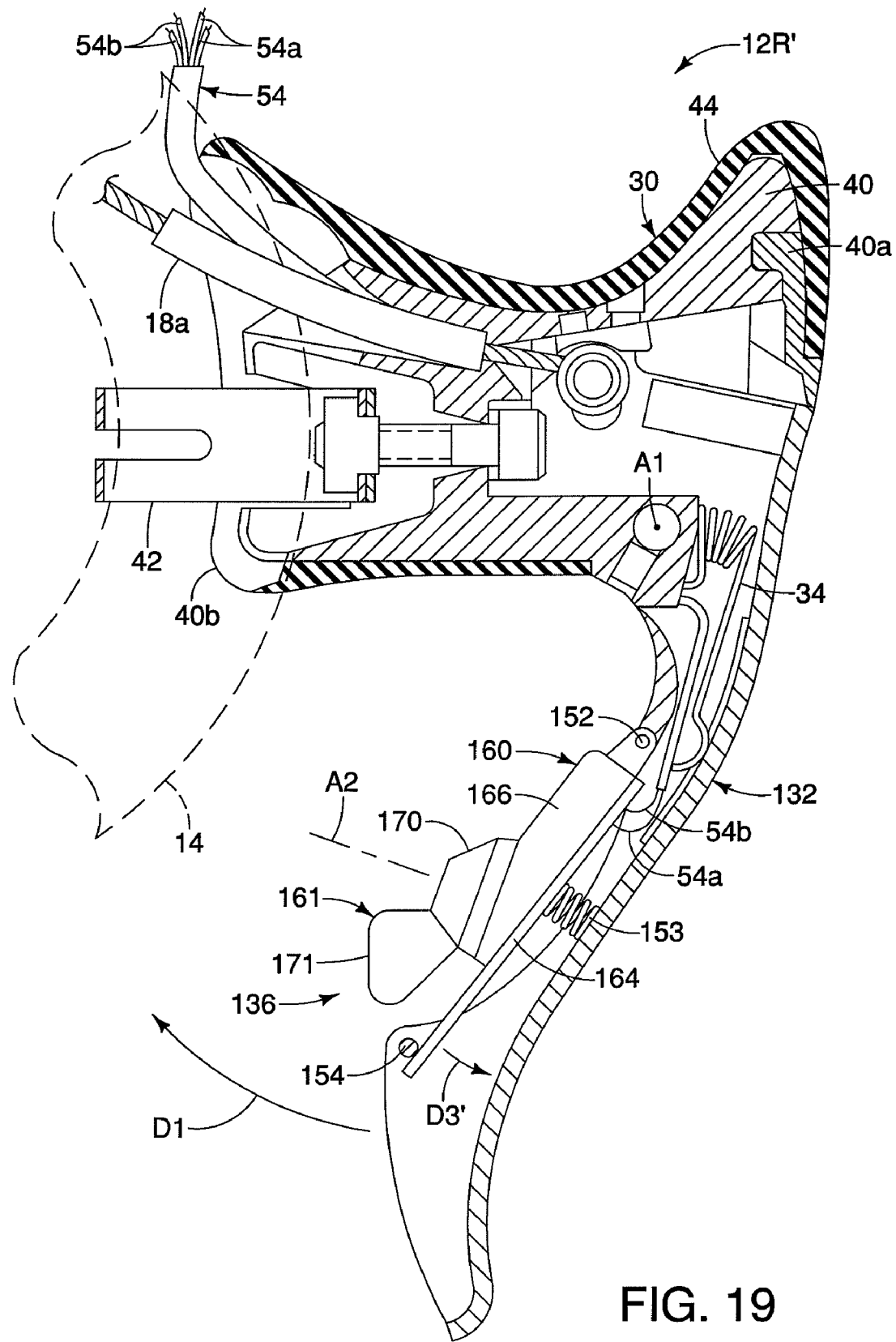
FIG. 19 is a cross sectional view of the modified right hand side bicycle control device as seen along section line 19-19 of FIG. 18, but with the electrical shift control switch illustrated in elevation in accordance with the second embodiment.

To perform a gear shifting operation, the shift operating member 61 is rotated to move from the rest position (FIG. 15) in the second direction D2 (i.e. counterclockwise as viewed in FIGS. 15 to 17) to a shift actuating position (FIG. 16). The shift actuating position corresponds to a shift signal sending position. When the brake operating lever 32 is moved in the first direction DI, the shift operating member 61 contacts the handlebar 14, which causes the shift operating member 61 to be rotated from the rest position (FIG. 15) in the third direction D3 which is a non-shifting direction (i.e. clockwise as viewed in FIGS. 15 to 17) to a non-shift actuating position in which the gear shifting operation is not performed. FIG. 17 shows a full stroke position of the shift operating member 61 in the third direction D3. The shift operating member 61 cannot move over the full stroke position in the third direction D3, since the toggle member 73 contacts a stopper 60a formed on the housing 60 at the full stroke position. Here, the shift operating member 61 is pivotally mounted with respect to the brake operating lever 32 about the rotational operating axis A2 such that the second and third directions D2 and D3 are opposite rotational directions. More specifically, the shift operating member 61 is movably mounted with respect to the brake operating lever 32 such that the second and third directions D2 and D3 are opposite directions with respect to the brake operating plane P of the brake operating lever 32.

As seen in FIG. 15 to 17, the basic structure of the electrical switch 62 is illustrated in a simplified form. In this illustration, the electrical switch 62 basically includes a stationary contact 82, a movable contact 84, a first toggle biasing element 86, a second toggle biasing element 88 and a movable contact biasing element 90. Generally, when the first shifting control device 36 is in the rest position, the toggle member 73 of the shift operating member 61 is located centrally between the first and second toggle biasing elements 86 and 88, with the biasing element 90 biases the movable contact 84 away from the stationary contact 82. The movable contact biasing element 90 is preferably formed of a leaf spring.

However, when the rider rotates the shift operating member 61 from the rest position (FIG. 15) in the second direction D2 (i.e. counterclockwise as viewed in FIGS. 15 to 17) to the shift actuating position (FIG. 16), this causes the pivot shaft 72 to pivot the toggle member 73 against the force of the first toggle biasing element 86, and to move the movable contact 84 into contact with the stationary contact 82 against the movable contact 84 against the force of the biasing element 90. In other words, the pivotal movement of the toggle member 73 causes the movable contact 84 to be deflected such that the deflected movable contact 84 directly contacts the stationary contact 82. Thus, an electrical connection is made between the stationary contact 82 and the movable contact 84 such that an electrical shift control signal is sent to the controller 24 to operate one of the bicycle shift mechanisms 16 and 20 based on the logic discussed above.

When the shift operating member 61 is rotated from the rest position (FIG. 15) in the third direction D3 (i.e. clockwise as viewed in FIGS. 15 to 17) to the non-shift actuating position or full stroke position (FIG. 17), this causes the pivot shaft 72 to pivot the toggle member 73 against the force of the second toggle biasing element 88, with the movable contact 84 remaining stationary. In other words, the pivotal movement of the toggle member 73 does not move the movable contact 84 such that the movable contact 84 and the stationary contact 82 remain spaced apart. Thus, an electrical connection is not made between the stationary contact 82 and the movable contact 84 such that no electrical shift control signal is sent to the controller 24 to operate one of the bicycle shift mechanisms 16 and 20. Accordingly, when the shift operating member 61 is moved in the third direction D3 by contacting the handlebar 14 or operation with the rider's finger, the movable contact 84 remains spaced from the stationary contact 82 such that the gear shifting operation is not performed.

As mentioned above, the controller 24 is electrically coupled to the first shifting control device 36 via the electrical cord 54. In particular, the first electrical conductor 54a of the electrical cord 54 is electrically connected to the movable contact 84. The second electrical conductor 54b of the electrical cord 54 is electrically connected to the stationary contact 82. When the contacts 82 and 84 are touching, the first conductor 54a is electrically connected to the second electrical conductor 54b via the contact bar 80 to transmit an electrical shift control signal to the controller 24.

The second shifting control device 38 is fixedly coupled to the inner side wall 30a of the brake lever bracket 30, as mentioned above. The second shifting control device 38 is functionally identical to the first shifting control device 36. Basically, the shift operating member and the housing of the second shifting control device 38 has been modified to provide a more integrated housing control switch. Preferably, the gripping body 40 of the brake lever bracket 30 forms a part of the housing of the second shifting control device 38. Thus, other than the modifications to the shift operating member and the housing of the second shifting control device 38, the first and second shifting control devices 36 and 38 of the bicycle control device 12R operate in an identical manner. Of course, the second shifting control devices 38 have rotational operating axes or pivot axes A3 oriented to be substantially parallel the brake pivot axis A1 of the brake operating lever 32.

Second Embodiment

Referring now to FIGS. 18 to 21, a right hand side control device 12R' will now be explained in accordance with a second embodiment. The control device 12R' is mounted to the bicycle handlebar 14 in the same manner as the first embodiment. A left hand side control device (not shown) is also provided that is essentially identical in construction and operation to the control device 12R', except that they are mirror images. Thus, only the control device 12R' will be discussed and illustrated herein.

Basically, the control device 12R' is identical to the device 12R of the first embodiment, except that that the brake operating lever 32 and the control switch 36 of the first embodiment have been replaced with a brake operating lever 132 and the shifting control device 136 in accordance with the second embodiment. Accordingly, the remaining parts of the second embodiment that are identical to the first embodiment will be given the same reference numerals as those used to explain the first embodiment for the sake of brevity.

In this embodiment, the shifting control device 136 is pivotally mounted on the rear side of the brake operating lever 132 to move between a rest position and a retracted (full stroke) position without causing the gear shifting operation. In particular, the shifting control device 136 is pivotally mounted on the rear side of the brake operating lever 132 by a pivot pin 152. The shifting control device 136 is biased to the rest position by a compression spring or biasing element 153 such that the shifting control device 136 contacts a restraining pin 154.

Preferably, the shifting control device 136 basically includes a housing or mounting portion 160, a shift operating member 161 and an electrical switch 162. The housing 160 has a base 164 and a cover 166 that is fixedly coupled to the base 164. The electrical switch 162 is housed within the housing 160 between the base 164 and the cover 166 and is electrically coupled to the electrical conductors 54a and 54b of the electrical cord 54. The housing 160 is pivotally mounted to the brake operating lever 132 by the pivot pin 152 for movement in a third direction D3' that is opposite the first direction D1. The shift operating member 161 is pivotally mounted to the housing 160 for movement in the second direction D2. Thus, the shift operating member 161 is movably mounted with respect to the brake operating lever 132 with the first and third directions D1 and D3' being parallel. When the shifting control device 136 pivots about the pivot pin 152 to move in the third direction D3', the shift operating member 161 moves with respect to the brake operating lever 132 to move closer to the brake operating lever 132 when the shift operating member 160 moves in the third direction D3'. In other words, the shift operating member 161 is pivotally mounted with respect to the brake operating lever 132 about the pivot axis A2 to move in the second direction D2 and pivotally mounted with respect to the brake operating lever 132 about the pivot axis of the pivot pin 152 to move in the third direction D3'.

The shift operating member 161 is rotatably coupled to the housing 160 in the same manner as the first embodiment, but the shift operating member 161 can only rotate in one direction (i.e., direction D2) from the rest position due a modification in the electrical switch 162 as explained below. The shift operating member 161 has a base 170 and a lever 171, with the base 170 fixedly mounted to the pivot shaft 72.

Moreover, in this embodiment, the shifting control device 136 with the shift operating member 161 moves in a third direction D3' that is opposite to the direction D1 of the brake operating lever 132.

Figure 21:
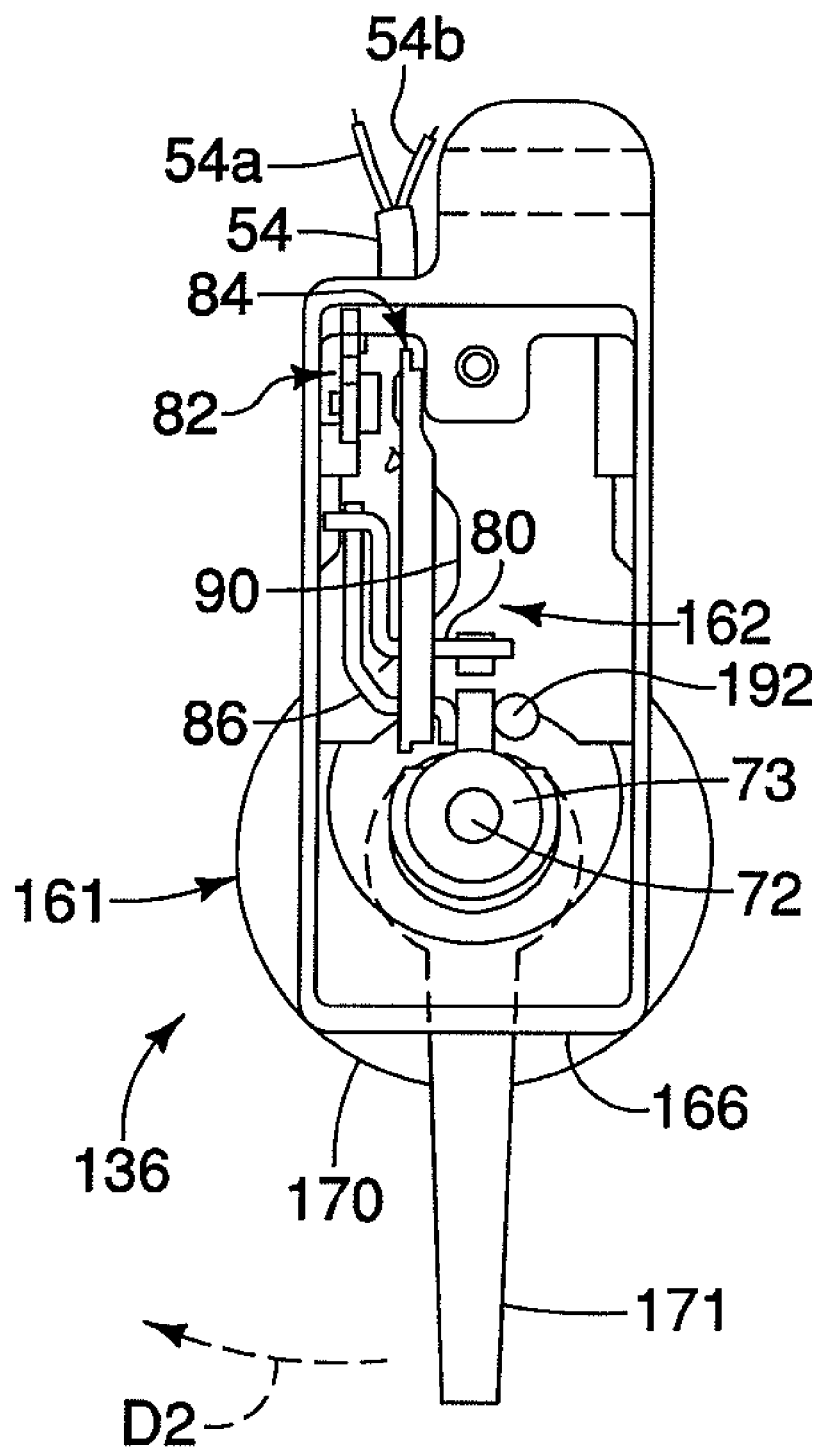
FIG. 21 is an elevational view (from the mounting side) of the electrical shift control switch illustrated in FIGS. 18 to 20, with the base removed to show the electrical shift control switch in the rest position, i.e., the movable contact spaced from the stationary contact so that no electrical connection is made between the contacts.

As seen in FIG. 21, the electrical switch 162 is mounted within the housing 160, and operated by the shift operating member 161. Basically, the electrical switch 162 is identical to the electrical switch 62 of the prior embodiment, except that the second toggle biasing element 88 has been replaced with a stop 192 as seen in FIG. 21. Accordingly, the identical parts of the electrical switches 62 and 162 will be given the same reference numerals as those used to explain the first embodiment for the sake of brevity. The stop 192 prevents rotational movement of the shift operating member 161 in the opposite direction to D2.

Figure 20:
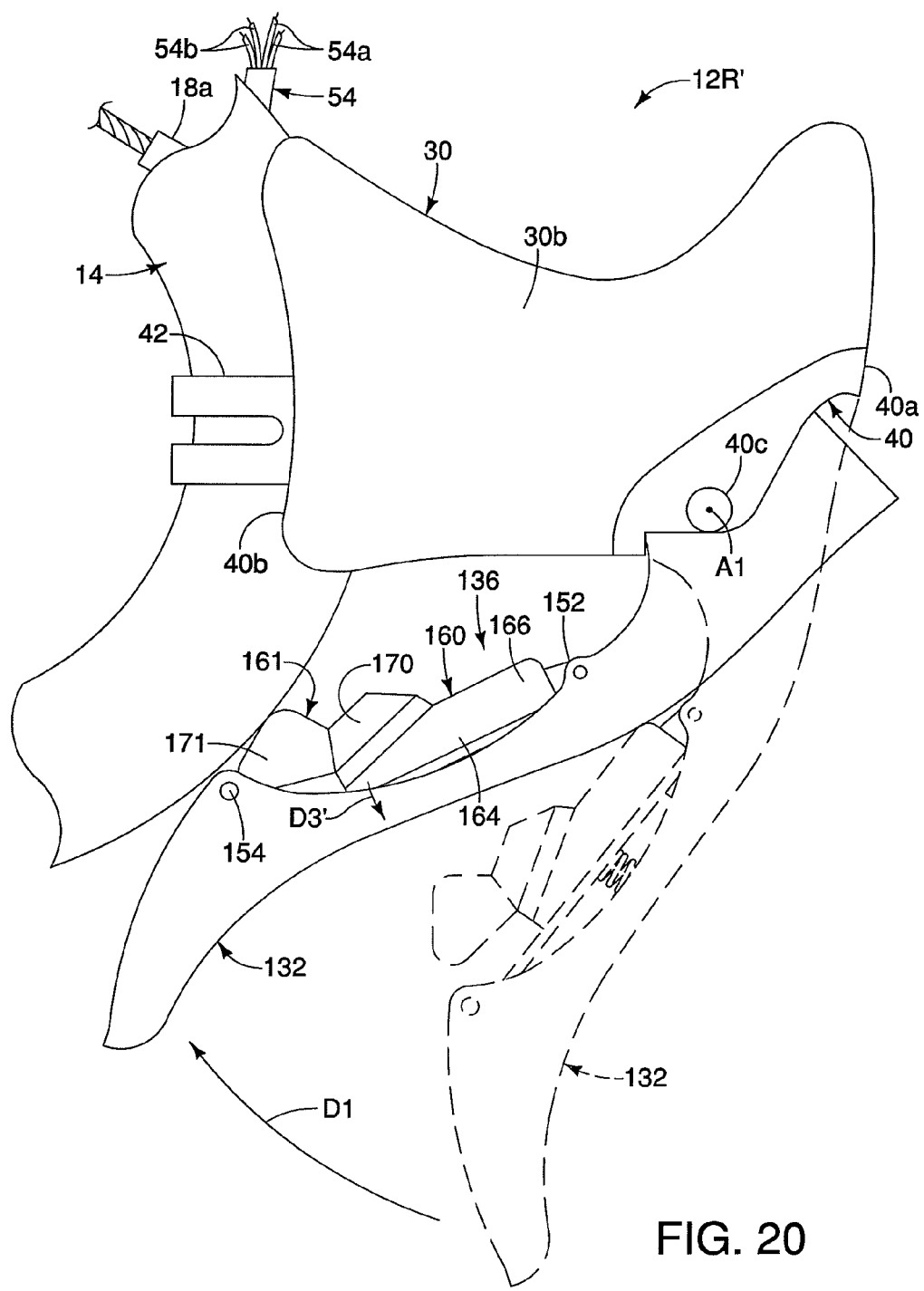
FIG. 20 is an enlarged outside elevational view of the modified right hand side bicycle control device illustrated in FIGS. 18 and 19 in accordance with the second embodiment with the brake operating lever in the braking position and the shift operating member moved to the retracted position.

The shift operating member 161 is mounted to a rearwardly facing side of the brake operating lever 132 by the housing 160 and extends towards the handlebar 14. When the brake operating lever 132 moves in the first direction D1, the shift operating member 161 also moves with the brake operating lever 132 in the first direction D1. At least initially, the relative position between the shift operating member 161 and the brake operating lever 132 remains unchanged since the shift operating member 161 is biased to the rest position. However, since the shift operating member 161 is mounted to a rearwardly facing side of the brake operating lever 132, when the shift operating member 161 contacts the handlebar 14 as seen in FIG. 20, the shift operating member 161 moves against the force of the spring 153 to the retracted (full stroke) position without causing the gear shifting operation. The shift operating member 161 cannot move over the full stroke position in the third direction D3', since a part of the housing 160 contacts the brake operating lever 132 at the full stroke position.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle operating device comprising:
a base member configured to be attached to a bicycle;
a brake operating lever pivotally coupled to the base member about a pivot axis to perform a braking operation when the brake operating lever is moved in a first direction by a user; and
a shift operating lever movably arranged relative to the base member to move from a rest position in a second direction to perform a gear shifting operation in response to operation of the shift operating lever by the user,
the shift operating lever being further arranged to move from the rest position to a full stroke position in a third direction different from the first and second directions in response to operation by the user of the brake operating lever in the first direction, the third direction being a non-shifting direction, the shift operating lever not performing the gear shifting operation when moved in the third direction,
the brake operating lever being movably arranged relative to the base member to move along a brake operating plane that is perpendicular to the pivot axis of the brake operating lever, and
the shift operating lever having a handlebar engagement of the bicycle portion that is laterally offset from the brake operating plane of the brake operating lever for contacting a handlebar when the brake operating lever is pivoted to perform the braking operation while the base member is mounted to the handlebar, the shift operating lever moving from the rest position to the full stroke position in the third direction in response to the handlebar engagement portion contacting the handlebar when the user operates the brake operating lever in the first direction.

2. The bicycle operating device according to claim 1, further comprising
an electrical switch operatively coupled to the shift operating lever to perform the gear shifting operation when the shift operating lever is moved from the rest position in the second direction.

3. The bicycle operating device according to claim 1, wherein
the shift operating lever is biased to the rest position.

4. The bicycle operating device according to claim 1, wherein
the shift operating lever is mounted to a rearwardly facing side of the brake operating lever.

5. The bicycle operating device according to claim 1, wherein
the shift operating lever is rotatably mounted with respect to the brake operating lever such that the second and third directions are opposite rotational directions, 6. The bicycle operating device according to claim 1, wherein
the shift operating lever is movably mounted with respect to the brake operating lever such that the second and third directions are opposite directions with respect to a pivot plane of the brake operating lever.

7. The bicycle operating device according to claim 1, further comprising
a housing rigidly fixed to the brake operating lever; and
an electrical switch mounted to the housing and operatively coupled to the shift operating lever to perform the gear shifting operation when the shift operating lever is moved from the rest position in the second direction.

8. The bicycle operating device according to claim 1, wherein
the shift operating lever is mounted on the brake operating lever to move with the brake operating lever when the brake operating lever moves in the first direction.

* * * * *